D. M. BLISS.
ALTERNATING CURRENT RECTIFIER.
APPLICATION FILED APR. 28, 1911.
1,194,470. Patented Aug. 15, 1916.
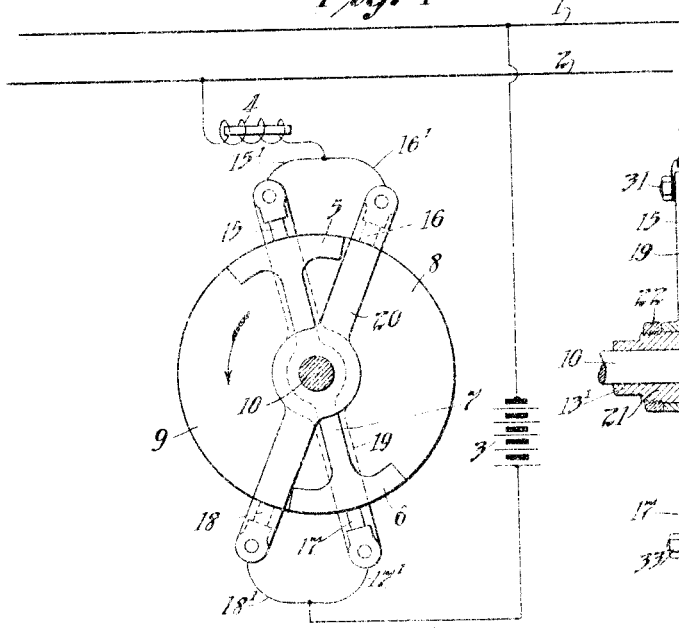
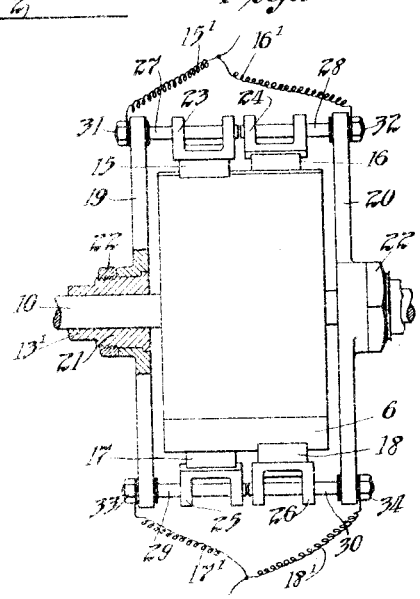
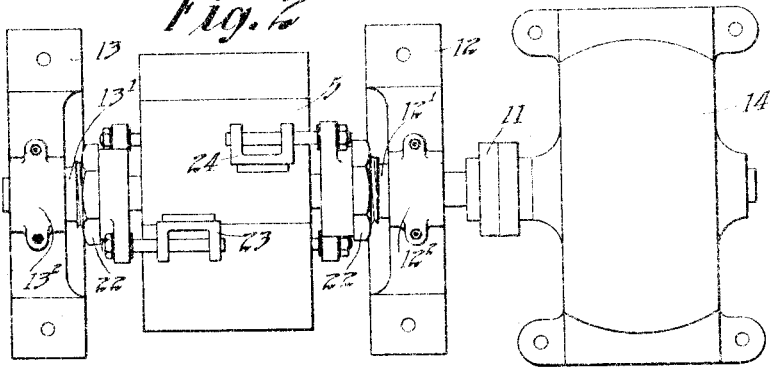
Witnesses:
Inventor:
Donald M. Bliss
by Frank L. Dyer
his Atty.

UNITED STATES PATENT OFFICE.

DONALD M. BLISS, OF WEST ORANGE, NEW JERSEY, ASSIGNOR TO THOMAS A. EDISON, INCORPORATED, OF WEST ORANGE, NEW JERSEY, A CORPORATION OF NEW JERSEY.

ALTERNATING-CURRENT RECTIFIER.

1,194,470.　　　　Specification of Letters Patent.　　Patented Aug. 15, 1916.

Application filed April 28, 1911. Serial No. 623,845.

*To all whom it may concern:*

Be it known that I, DONALD M. BLISS, a subject of the King of Great Britain, and a resident of West Orange, in the county of Essex and State of New Jersey, have invented certain new and useful Improvements in Alternating-Current Rectifiers, of which the following is a specification.

My invention relates generally to rectifiers of the commutator type, that is to say, rectifiers in which the rectification of the alternating current is accomplished by producing relative movement between conducting segments and contact devices or brushes in synchronism with the current to be rectified in such a manner that impulses of current from the alternating current circuit are conducted unidirectionally into a direct current work or consumption circuit. Apparatus of this class may be so arranged as to utilize both half waves or only alternate half waves of the alternating current, and my invention is applicable to either arrangement of apparatus. When such apparatus is used to supply a consumption circuit having a counter or opposing electromotive force, it is desirable to utilize only a portion of each half wave or of each alternate half wave in order that there may be no reversal in direction of current flow through the direct current consumption circuit. The extent of the portion of the half wave which it is desirable to utilize depends on the relative value of the counter electromotive force and the maximum electromotive force of the alternating current wave, and decreases as the counter electromotive force increases.

The object of my invention is to provide simple and efficient means in a rectifier of the commutator type for utilizing all or any desired portion of each half wave or of each alternate half wave.

My improved rectifier is particularly adapted for supplying unidirectional current to a consumption circuit having a counter electromotive force, as for example, in charging storage batteries.

In order that my invention may be more clearly understood, reference is made to the accompanying drawings which form a part of this specification, and in which:—

Figure 1 is a view, partly diagrammatic, of a rectifier embodying my invention, and showing the alternating current mains together with a storage battery and connections; Fig. 2 is a plan view of the rectifier together with the motor for driving it; and Fig. 3 is a vertical elevation, partly in section, of the rectifier.

In the several views of the drawings like reference characters refer to like parts.

Referring to the drawings, I have shown one embodiment of my improved rectifier connected across the alternating current mains 1 and 2, which are supplied with alternating current from any suitable source. The rectifier is shown connected in series with the storage battery 3 and an adjustable reactance 4. The circuit containing the storage battery 3 is typical of any direct current consumption circuit having an opposing or counter electromotive force. The rectifier comprises a rotatable switch or commutator having conducting segments 5 and 6 connected by a conducting member 7, and portions 8 and 9 of insulating material, or of conducting material insulated from each other and from the conducting segments 5 and 6 and the conducting connection 7. The rotatable switch or commutator is fixedly secured to a shaft 10 which is mounted for rotation in suitable bearings contained in or supported by the brackets or supports 12 and 13. The conducting segments 5 and 6 and the connection 7 are insulated from the shaft 10 in any suitable manner. The portions 8 and 9 if made of conducting material are also insulated from the shaft 10. At 14 is shown a synchronous motor or any other suitable means for rotating the rotatable switch or commutator in synchronism with the alternating current which is to be rectified. The synchronous motor may be connected across the alternating current mains 1 and 2. The motor 14 is shown mechanically connected to the shaft 10 by any suitable connection or clutch 11.

Sets of brushes 15, 16, and 17, 18 are provided for coöperation with the conducting segments 5 and 6. The brushes 15 and 16 are connected in parallel in the circuit by the conductors 15′ and 16′ and the brushes 17 and 18 are connected in parallel in the circuit by the conductors 17′ and 18′. The brushes 15 and 17 are mounted upon opposite ends of the rocker arm 19, and the brushes 16 and 18 are mounted upon opposite ends of the rocker arm 20. It is to be noted, therefore, that one brush of each set is mounted upon opposite ends of each rocker arm. The rocker arm 19 is adjustably mounted upon an extension 21 of the journal-bearing 13', and the rocker arm 20 is mounted upon a similar extension of the journal-bearing 12'. The journal bearings 13' and 12' are supported by the bearing supports 13 and 12 respectively, and are secured to the same in any suitable manner, as for example, by the clamps 13² and 12². The rocker arms are angularly adjustable about the axis of the shaft 10, and nuts 22 are threaded upon the extensions of the journal-bearings, in order to provide means for securing the rocker arms in adjusted position. The brushes 15, 16, 17 and 18 are preferably spring pressed and are carried in brush holders 23, 24, 25, and 26 respectively. The brush holders 23 and 25 are supported from the rocker arm 19 by means of the rods 27 and 29. These rods are insulated from the rocker arm 19 and are provided with nuts 31 and 33 for connection with conducting wires or cables. Similarly, the brush supports 24 and 26 are supported from the rocker arm 20 by means of the rods 28 and 30 which are insulated from the rocker arm 20 and are provided with nuts 32 and 34 for connection with conducting wires or cables.

The mode of operation of the rectifier which I have illustrated and described is as follows: The rotary switch or commutator is rotated in synchronism with the current to be rectified in such a manner that a positive impulse from the alternating current circuit during one half wave or portion thereof is conducted from the main 2 to the main 1 by the following circuit, namely: reactance 4, one or both of the conductors 15' and 16', one or both of brushes 15 and 16, the conducting segment 5, the conducting connection 7, the conducting segment 6, one or both of brushes 17 and 18, one or both of the conductors 17' and 18', the battery 3, or in the reverse direction as the battery or other translation device in the direct current consumption circuit may require. At or before the reversal of direction of current flow in the alternating current circuit, the circuit which I have traced is broken by the brushes moving out of contact with the conducting segments, but this circuit is reestablished at or after the next reversal of current in the alternating current circuit. The rotatable switch or commutator makes one complete revolution for each two complete waves or alternations of the alternating current. In the apparatus which I have illustrated as one embodiment of my invention, only alternate half waves of alternating current are utilized, but my invention is equally applicable to rectifiers or rectifier systems for utilizing both half waves of alternating current.

The conducting segments 5 and 6 are equal in length, and of a length corresponding to the minimum portion of the half wave of the alternating current which is to be utilized under any circumstances. In order that the duration of contact between the conducting segments and the brushes shall be a minimum, the rocker arms are so adjusted that they are parallel with each other, or so that the brushes of any one set are in alinement with each other in a direction parallel to the axis of the commutator, thereby securing a minimum effective brush width.

In order to increase the extent of the portion of the half wave of alternating current which is to be utilized, the rocker arms are adjusted so that their projections on a plane at right angles to the shaft 10 make an angle with each other, or otherwise expressed, so that the brushes of any one set, for example, brushes 15 and 16 are spaced apart circumferentially around the commutator. In this way the effective brush width is increased and the duration of effective contact between a set of brushes and a conducting segment is increased. The increased duration of effective contact corresponds to the distance apart of the brushes of a set measured along the surface of the commutator in a plane at right angles to the shaft. When the brushes are thus placed apart, the duration of effective contact is approximately equal to that between a single brush and a commutator segment whose length is increased by the distance between the centers of the spaced apart brushes measured circumferentially around the commutator.

It is to be noted that in the apparatus illustrated the adjustment of the brushes of a single set effects at the same time the adjustment of the brushes of the other set.

In charging storage batteries, the brushes of each set may be spaced apart as described above a considerable distance at the beginning of the charging operation because the counter electromotive force of the battery is small. The proper position of the brushes may be determined by setting them so that the rectification is accomplished with little or no sparking. As the battery voltage rises, the rocker arms should be moved to positions approaching parallelism.

The adjustable reactance 4 enables the phase relation between the charging current and the motor current to be varied as the conditions of load and the charging circuit may demand.

It will be evident that various changes in construction and arrangement may be made without departing from the spirit and scope of my invention as defined in the appended claims. For example, the commutator may be held stationary and the brushes rotated, and instead of a cylindrical commutator having conducting surfaces on its periphery, I may employ a disk having conducting surfaces on its face. Furthermore, other means may be employed for supporting the brushes.

Having now described my invention, what I claim and desire to protect by Letters Patent is as follows:

1. In a rectifying device, a commutator, two sets of brushes coöperating therewith and two rocker arms mounted concentrically with the commutator, one at each end thereof and freely adjustable with respect to each other, each rocker arm carrying a plurality of said brushes including at least one brush of each set, substantially as described.

2. In a rectifying device, a rotatable commutator having a pair of connected and oppositely disposed conducting segments, rocker arms adjustable around the axis of rotation of the commutator, and two sets of brushes located to coöperate with the conducting segments, the said brushes being supported by the said rocker arms, and the brushes of each set being adjustable relatively to one another, substantially as described.

3. In an alternating current rectifier, a rotatable commutator having a plurality of conducting segments, a plurality of sets of brushes coöperating therewith, the brushes of each set being electrically connected together, and a plurality of the brushes of each set simultaneously contacting with each of said segments successively in each rotation of said commutator, and means whereby relative adjustment of the brushes of each set may be effected simultaneously to vary the duration of effective contact between each set of brushes and the conducting segments, substantially as described.

4. An alternating current rectifier, comprising a commutator having a pair of connected and oppositely disposed conducting segments and two sets of brushes coöperating therewith, the brushes of each set being relatively adjustable to vary the duration of effective contact between each conducting segment and a set of brushes, substantially as described.

This specification signed and witnessed this 27th day of April, 1911.

DONALD M. BLISS.

Witnesses:
HENRY LANAHAN,
ANNA R. KLEHM.